July 1, 1941. K. SCHWEBS Re. 21,849

REFRIGERATOR FREIGHT CAR

Original Filed Sept. 9, 1937

INVENTOR

KENT SCHWEBS

BY

ATTORNEYS

Reissued July 1, 1941

Re. 21,849

UNITED STATES PATENT OFFICE 21,849

REFRIGERATOR FREIGHT CAR

Kent Schwebs, Hortonville, Wis.

Original No. 2,136,894, dated November 15, 1938, Serial No. 163,065, September 9, 1937. Application for reissue May 27, 1940, Serial No. 337,560

20 Claims. (Cl. 62—19)

This invention appertains to shipping of perishable articles, and more particularly to refrigerator freight cars and trucks, and is an improvement on my Patent 2,159,406 of May 23, 1939.

In said patent, I illustrate means for continuously circulating air through the foodstuffs and the ice bunkers to facilitate the cooling and keeping thereof, by the use of air-driven turbines.

It is, therefore, one of the primary objects of my invention to provide a pump mechanism operated in a novel manner from the car wheels for placing a liquid, such as oil, under pressure and utilizing the liquid for operating a turbine, which, in turn, is utilized for actuating the fan for circulating the air through the car.

A further salient object of my invention is to provide a rockable platform on one of the car trucks carrying a rotary pump and a drive shaft for the pump provided with a friction pulley yieldingly urged into engagement with one of the car truck wheels for continuously operating the pump, with novel means for leading the fluid under pressure from the pump to the turbine.

A further object of my invention is to provide a novel arrangement of pipes and valves for connecting the rotary pump with the turbine, whereby, irrespective of the direction of movement of the car, the turbine will be continuously driven in one direction.

With these and other objects in view, the invention consists in the novel construction, arrangement, and formation of parts, as will be hereinafter more specifically described, claimed, and illustrated in the accompanying drawing, in which drawing:

Figure 1:
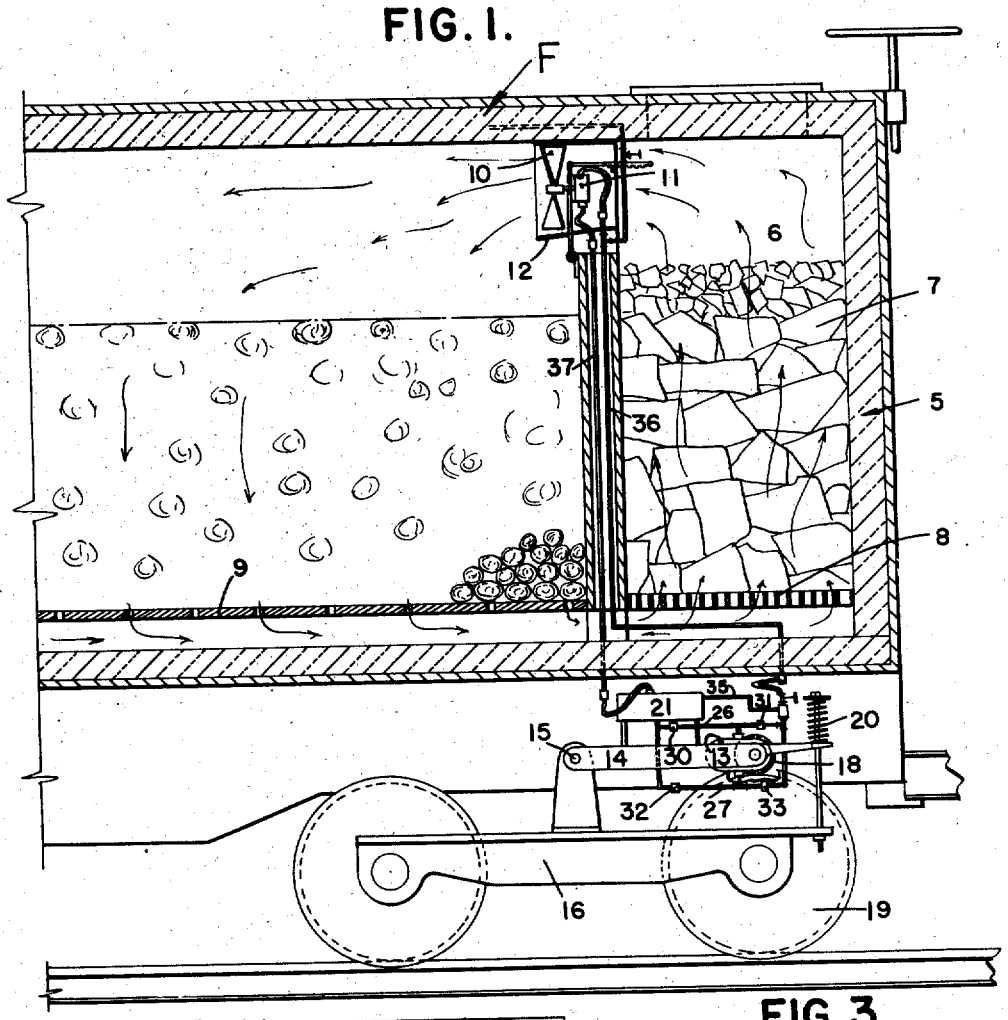
Fig. 1 is a fragmentary longitudinal section through a refrigerated freight car, showing my improved appliance incorporated therewith.

Referring to the drawing in detail, wherein similar reference characters designate corresponding parts throughout the several views, the letter F generally indicates a refrigerator freight car, and the same embodies the usual insulated body 5 having a partition 4 forming a bunker compartment 6 separate from the storage compartment for the reception of ice 7, or heating means. The ice rests on a grating 8 arranged above the level of the car floor. The body of the car is likewise provided with a suitable perforated false bottom 9, on which the foodstuffs to be shipped are placed.

In accordance with my invention, I arrange preferably at the upper end of the bunker compartment an air circulating fan 10, which is adapted to circulate air between the ice or heating means in the bunker compartment to and around the foodstuffs in the storage compartment. It is to be understood that a fan is preferably provided at each end of the car. The fan 10 is adapted to be driven by a turbine 11, which can be of any desired make or character. If preferred, means can be provided for adjusting the position of the fan and turbine, and, if desired, the same can be mounted within a suitable hood 12.

In accordance with my invention, I provide novel means for supplying fluid under pressure to the turbine, and this means consists of a rotary pump 13 with the drive shaft 17 of the pump keyed or otherwise secured to a friction pulley 18, which is adapted to rest upon the periphery of one of the car wheels 19 of the car truck 16. This rotary pump 13 is mounted upon a platform or lever 14. The lever 14 is rockably mounted at one end, as at 15, on a suitable portion of one of the trucks 16 of the freight car. When a car rounds a curve the truck moves relative to the car body in a horizontal plane and in my arrangement the pulley moves with the truck wheel and maintains its engagement therewith.

Spring means 20 may be provided for normally urging the lever 14 downwardly so that the friction pulley 18 will be held continuously in engagement with its car wheel. The lever or platform 14 can also have mounted thereon a reservoir tank 21 for the liquid which is to be placed under pressure. I prefer to utilize oil, as oil will not freeze during the winter season and will serve as means for maintaining the pump in good working condition at all times.

Figure 2:
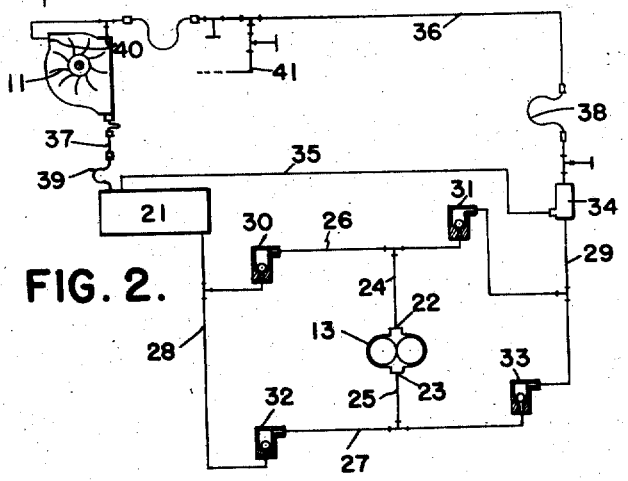
Fig. 2 is a diagrammatic view illustrating the novel arrangement of pipes and valves for connecting the rotary pump with the turbine, whereby to rotate the turbine continuously in one direction, irrespective of the direction of rotation of the pump.
Figure 3:
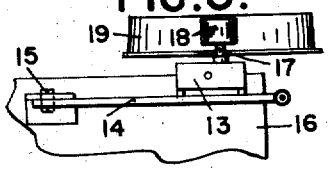
Fig. 3 is a detail fragmentary view illustrating the means utilized for operating the pump.

By referring to Figure 2, it can be seen that I connect with the ports 22 and 23 of the pump 13, liquid-conducting pipes 24 and 25 respectively. These pipes 24 and 25 are in turn connected by T-couplings with pipes 26 and 27. The pipes 26 and 27, at one side, are connected with a pipe 28, which leads to the reservoir tank 21. The pipes 26 and 27 are connected on the other side with a pipe 29, the purpose of which will be later described.

The pipe 26, on opposite sides of the pipe 24, has interposed therein one-way check valves 30 and 31. The pipe 27, on opposite sides of the pipe 25, has interposed in the length thereof one-way check valves 32 and 33. The pipe 29 has a pressure relief valve 34 interposed in the length thereof and this relief valve is connected with a by-pass pipe 35 which leads to the reservoir 21 so as to regulate the pressure of the liquid when delivered to the turbine. As the pump is operated by a wheel of the truck a fast moving train might build up too great a pressure against the turbine. All of these pipes and valves mentioned are preferably mounted upon the rocking platform or lever 14, and feed and return pipes 36 and 37 are arranged in the freight car. The feed pipe 36 is connected with the pipe 29 by flexible pipe or hose 38, and the return pipe 37 is connected with the reservoir 21 by flexible pipe or hose 39.

The pipe 36 supplies fluid under pressure to one or more nozzles 40 for supplying the liquid under pressure to the buckets of the turbine wheel. As the oil leaves the turbine wheel, the same is collected in the turbine casing and flows back into the reservoir through the pipes 37 and 39.

The arrangement of the pipes and valves on the car truck is such that, irrespective of the direction of the rotation of the pump by the car wheels or, in other words, irrespective of the direction of movement of the car and train the turbine will be driven continuously in one direction.

By referring to Fig. 2 and presuming that the pump is driven in a direction for forcing liquid under pressure through the pipe 24 and for drawing the liquid from the pipe 25, the liquid under pressure flowing through the pipe 24 will seat the one-way check valve 30 and will open the one-way check valve 31, and this liquid under pressure will flow through the pipe 29 to the feed pipe 36 of the turbine. The pressure of the fluid will close the valve 33. The suction in the pipe 25 will open the one-way check valve 32, and consequently liquid will be drawn from the reservoir.

If the pump is driven in a reverse direction, and the fluid is forced under pressure through the pipe 25, and liquid is drawn into the pump from the pipe 24, then the one-way check valve 33 will be opened and the liquid will be supplied to the turbine through the pipe 29 and pipe 36. The liquid under pressure will seat the one-way check valve 32, and suction in the pipe 24 will open the one-way check valve 30, and thus liquid will be drawn from the reservoir 21 to the pump. A line pipe 41 can be connected with the pipe 36 for conducting liquid under pressure to the turbine disposed at the opposite end of the car.

It is to be understood that various arrangements of the lever or platform 14 can be had, and that the same can be mounted in various manners on the car truck, and that the arrangement shown is only by the way of illustration. If desired, the tank itself can form the lever or part thereof, and the tank can carry the pump and the check and safety valves.

While I have referred to the bunker 6 as receiving ice, it is to be understood that in the winter season a heater may be substituted for the ice, whereby the foodstuffs will be maintained against freezing.

During loading and while the car is standing still, extraneous motors can be utilized for operating the pump, or other means can be provided for circulating air through the car.

It is also to be understood that while I have shown the pump driven from the car wheel, the pump can be driven in any preferred manner from any moving part of the car. Likewise, a centrifugal or other positive air displacement pump can be utilized.

Changes in details may be made without departing from the spirit or the scope of my invention, but what I claim as new is:

1. Means for operating a fan for circulating air in a refrigerator car, said means including a turbine, a pump for delivering liquid under pressure to the turbine, means for driving the pump from a moving part of the car, said last mentioned means being movable toward and away from the moving part of the car, whereby to permit the driving of the pump from a source other than the car when the car is standing still and when said driving means is away from the moving part of the car, and means for leading the liquid from the pump continuously in one direction to the turbine, irrespective of the direction of rotation of the pump.

2. Means for operating a fan for circulating air in a refrigerator car, said means including a turbine, a rotary pump, means for driving the pump from a moving part of the car, a feed pipe for liquid under pressure leading from the pump to the turbine, a return line for spent liquid, leading from the turbine to the pump, said return line having a reservoir therein, oppositely directed pipes connected with the ports of the pump, and a system of pipes and one-way check valves for connecting the last mentioned pipes with the feed and return pipes for continuously delivering liquid under pressure to the feed pipe, irrespective of the direction of rotation of the pump.

3. In a refrigerator car having a storage compartment and a bunker therein, of an air-circulating fan arranged adjacent to the bunker for drawing air therethrough and for delivering the air into the storage compartment and means for operating the fan including a turbine, a rotary pump, a reservoir for liquid, a lever rockably mounted at one end upon one of the trucks of the car carrying the pump and the reservoir, a friction pulley connected with the drive shaft of the pump, spring means engaging the lever normally holding the friction pulley in engagement with one of the car wheels of the car truck, a feed pipe for conducting liquid under pressure of the turbine, a return pipe for conducting spent liquid from the turbine to the reservoir, oppositely directed pipes connected with the ports of the pump, branch pipes connected with the last mentioned pipes having one-way check valves at their terminals, means connecting the check valves at one side of the reservoir, and means connecting the check valves at the other side to the feed pipe.

4. Means for operating a fan for circulating air in a refrigerator car, said means including a turbine, a pump delivering liquid under pressure to said turbine, means for separating air from said liquid caused by the liquid being forced against said turbine, means for driving the pump from a wheel of the truck of the car, and means for providing a continuous flow of liquid in one direction to the turbine, irrespective of the direction of movement of the car.

5. Means for operating a fan for circulating air in a refrigerator car, said means including a turbine, a pump delivering liquid under pressure through a pipe system to said turbine, means for separating air from said liquid caused by the liquid being forced against said turbine, means for driving the pump from a wheel of the truck of the car, means for providing a continuous flow of liquid in one direction to the turbine, irrespective of the direction of movement of the car, and a by-pass including a check valve in said pipe system to prevent the pump from causing too great a pressure of the liquid against the turbine.

6. A refrigerator car having a bunker compartment separate from a storage compartment, means to provide air communication between said compartments, and a truck comprising a frame supported by wheels in combination with an air circulating fan for circulating air between said compartments through said means, a turbine for operating said fan, a pump for delivering liquid under pressure to said turbine for operation thereof, a pulley for operation of said pump, said pulley adapted to rest upon the periphery of one of said wheels, a pipe system between said pump and said turbine, and a platform rockably mounted upon said truck frame, said pulley and said pump being mounted upon said platform, said pipe system being provided with flexible connections between the elements mounted on the platform and the elements of the car body.

7. A refrigerator car including a body, a truck comprising a frame supported by wheels in combination with an air circulating fan in the car body, a turbine for operating said fan, a pump for delivering liquid under pressure to said turbine for operation thereof, a pulley for operation of said pump, said pulley adapted to rest upon the periphery of one of said wheels for rotation thereof by the wheel when the car is moving, and a platform rockably mounted upon said truck frame independently of the car body, said pulley and said pump being mounted upon said platform.

8. A structure as defined in claim 7 wherein means are provided to yieldingly urge said pulley continuously in engagement with said wheel.

9. A structure as defined in claim 7 wherein means are provided to yieldingly urge said pulley continuously in engagement with said wheel, said means including a rod secured to said truck frame and extending upwardly through said platform, a spring embracing the post of said rod, said spring being under compression.

10. Means for operating a fan for circulating air in a refrigerator car, said means including a turbine, a rotary pump, means for driving said pump from a rotating part of the truck of the car, a feed line for liquid under pressure leading from the pump to the turbine, a return line for spent liquid from the turbine to a reservoir and thence to the pump.

11. A structure as defined in claim 10 including a relief valve in the feed line and a line connecting said valve and said reservoir.

12. Means for operating a fan for circulating air in a refrigerator car, said means including a turbine, a rotary pump, means for driving said pump from a rotating part of the truck of the car, a feed line for liquid under pressure leading from the pump to the turbine, a return line for spent liquid from the turbine to the upper part of a reservoir and from the lower part of the reservoir to the pump, said reservoir being at a higher elevation than said pump.

13. Means for operating a fan for circulating air in a refrigerator car, said means including a pipe system, a turbine, a variable speed pump producing a pressure of liquid in said system in proportion to the speed thereof for delivering liquid in one direction to said turbine irrespective of the direction of movement of the car, means for driving said pump from a rotating part of the truck of the car, and a by-pass in said system including a pressure relief valve.

14. Means for operating a fan for circulating air in a refrigerator car, said means including a turbine, a rotary pump, a pulley engageable with a rotating part of one of the trucks of the car for operating said pump, a feed line for liquid under pressure from the pump to the turbine, a return line for spent liquid from the turbine to the pump, and a liquid reservoir in said return line.

15. Means for operating a fan for circulating air in a refrigerator car, said means including a turbine, a rotary pump, a pulley engageable with a rotating part of one of the trucks of the car for operating said pump, a feed line for liquid under pressure from the pump to the turbine, and a return line for spent liquid from the turbine to the pump, said pulley being supported by the car structure so as to keep the pulley in continuous engagement with said rotating part irrespective of the relative movement between the car body and the wheeled trucks.

16. A structure as defined in claim 15 wherein the pulley and pump are mounted upon a single axle for simultaneous operation, said pulley being supported by the car structure so as to keep the pulley in continuous engagement with said rotating part irrespective of the relative movement between the car body and the wheeled trucks.

17. A structure as defined in claim 15 including means to yieldingly press said pulley continuously in engagement with said rotating part.

18. A structure as defined in claim 15 including means to yieldingly press said pulley continuously in engagement with said rotating part, and means to adjust the pressure of said yielding means.

19. A refrigerator car having a partition separating a bunker compartment from the storage compartment, openings adjacent the upper and lower parts of said partition to provide means for air communication between said compartments, an air circulating fan in the upper part of said openings for drawing air from one of said compartments and delivering it to the other of said compartments, means for operating said fan including a turbine, a pump, means for driving said pump, a feed line for liquid under pressure leading from the pump to the turbine, and a return line for spent liquid from the turbine to the pump, said feed line and return line being located within said partition.

20. A refrigerator car having a partition separating a bunker compartment from the storage compartment, openings adjacent the upper and lower parts of said partition to provide means for air communication between said compartments, an air circulating fan in the upper part of said openings for drawing air from one of said compartments and delivering it to the other of said compartments, means for operating said fan including a turbine, a pump, means for driving said pump, a feed line for liquid under pressure leading from the pump to the turbine, and a return line for spent liquid from the turbine to the pump, and a reservoir for said liquid in the return line, said feed line and return line being located within said partition and said reservoir and said pump being located below the car body.

KENT SCHWEBS.